United States Patent [19]

Angus et al.

[11] 3,750,103
[45] July 31, 1973

[54] ELECTRONIC SYSTEM EMPLOYING PLURAL PROCESSING STATIONS FOR ISSUING AIRLINE BOARDING PASSES WHILE EFFECTING SEAT ASSIGNMENTS, AND GENERALLY FOR PARCELLING ELEMENTS OF AN ORDERED SET

[75] Inventors: David R. Angus, Flemington, N.J.; William Reid Smith-Vaniz, Darien, Conn.

[73] Assignee: General Computing Equipment Corporation, Princeton, N.J.

[22] Filed: Dec. 30, 1970

[21] Appl. No.: 102,629

[52] U.S. Cl. .................. 340/153 R, 340/286 R
[51] Int. Cl. .................. H04q 1/00, H04q 3/00
[58] Field of Search .................. 340/153 R, 286 R

[56] References Cited
UNITED STATES PATENTS

| | | | |
|---|---|---|---|
| 2,542,890 | 2/1951 | Basu | 340/153 |
| 3,675,204 | 7/1972 | Miehle | 340/286 |
| 2,568,756 | 9/1951 | McWhirter | 340/153 |
| 2,594,960 | 4/1952 | May | 340/153 X |
| 2,910,238 | 10/1959 | Miles | 340/153 X |
| 3,071,753 | 1/1963 | Fritze | 340/153 |
| 3,134,016 | 5/1964 | Connolly | 340/153 X |
| 3,241,117 | 3/1966 | Schottle | 340/153 |
| 3,484,748 | 12/1969 | Greenblum | 340/153 |

Primary Examiner—Harold I. Pitts
Attorney—Sandoe, Hopgood & Calimafde

[57] ABSTRACT

A digital, electronic system for issuing airline boarding passes, while effecting aircraft seat assignments, employs a central processor unit connected via a plurality of system busses to a plurality of parallel connected keyboard units each having a boarding pass enscribing alpha-numeric printer associated therewith. The central processor includes a circulating memory for storing information characterizing the availability of seats for the particular aircraft in service, while the keyboard units include a lamp matrix for displaying seat availability in a section (zone) of the aircraft selected by a passenger.

The central processor sequentially and cyclically polls all on line keyboard units, accommodating all proper seat requests while maintaining real time supervision over the memory contents and the keyboard units. Seat assignments are automatically printed, together with other pertinent information, on a boarding pass when a seat is selected.

21 Claims, 12 Drawing Figures

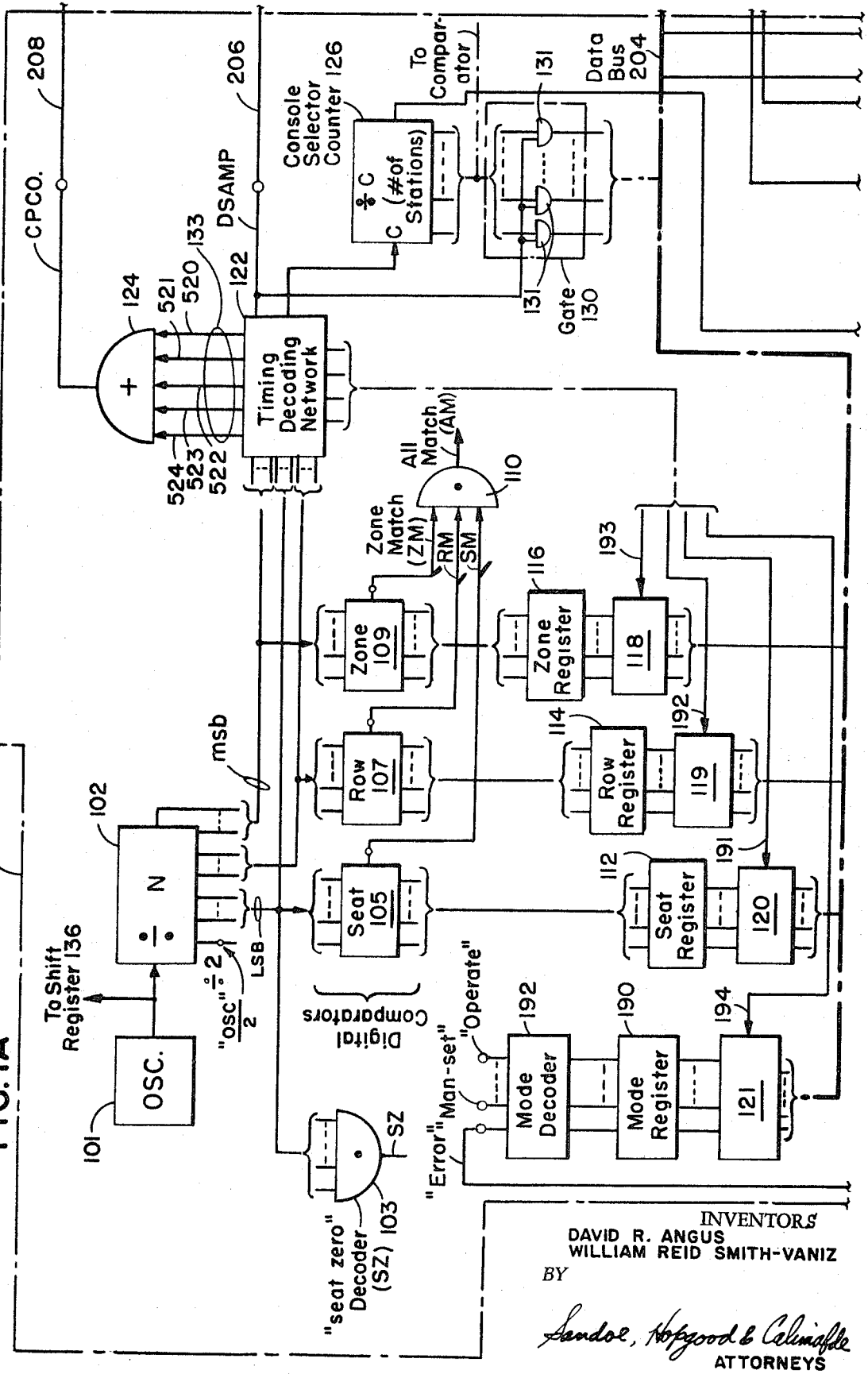

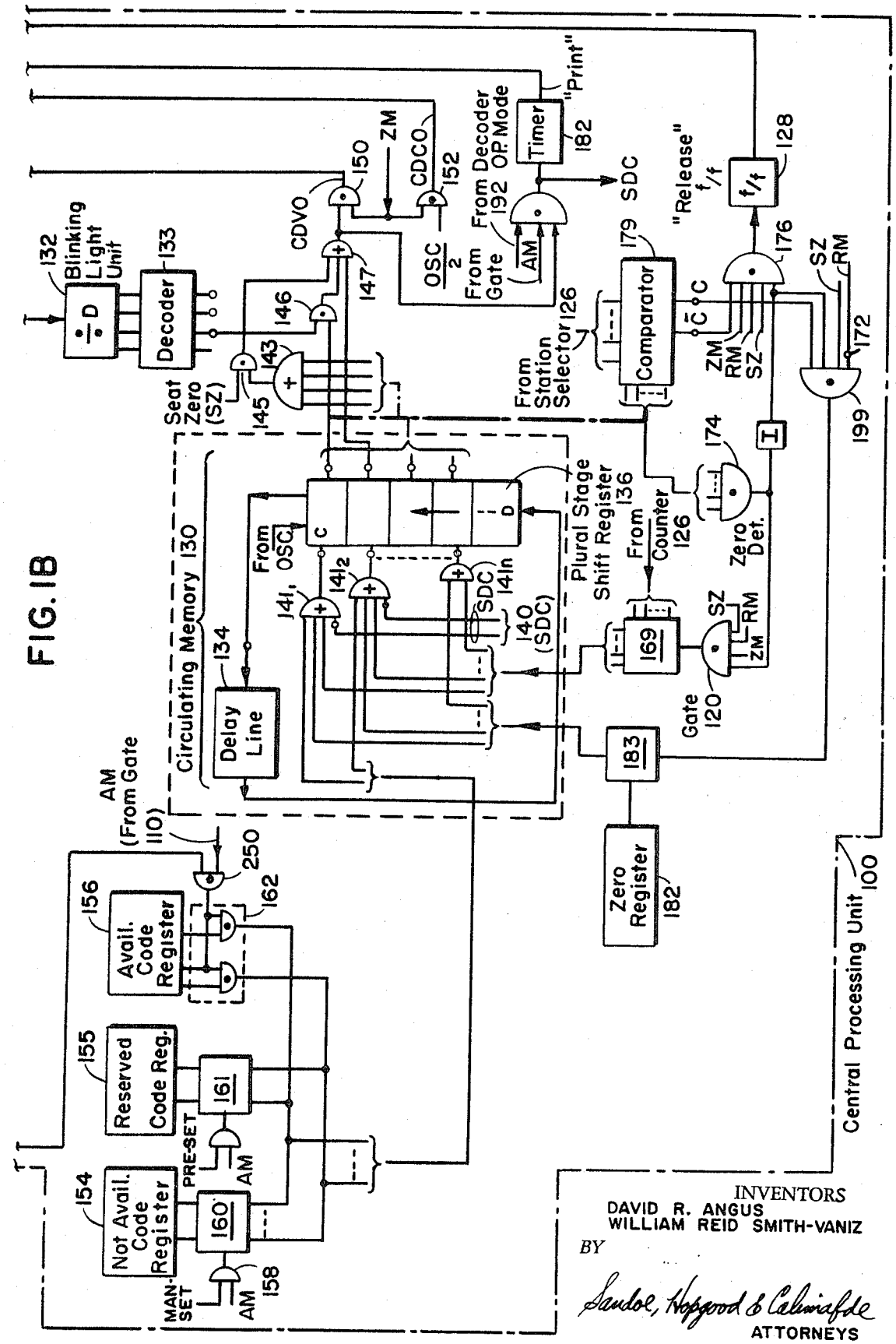

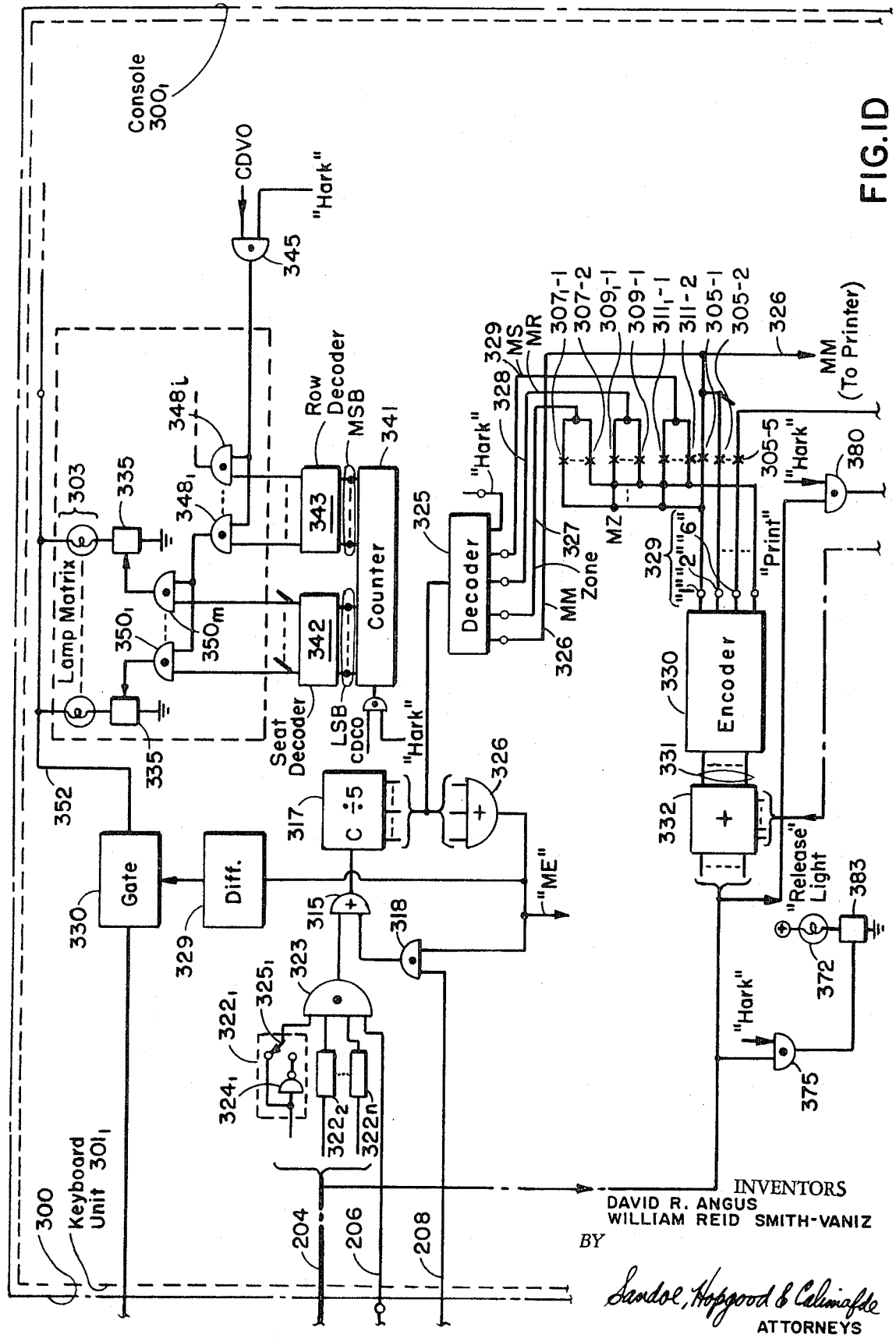
FIG.ID

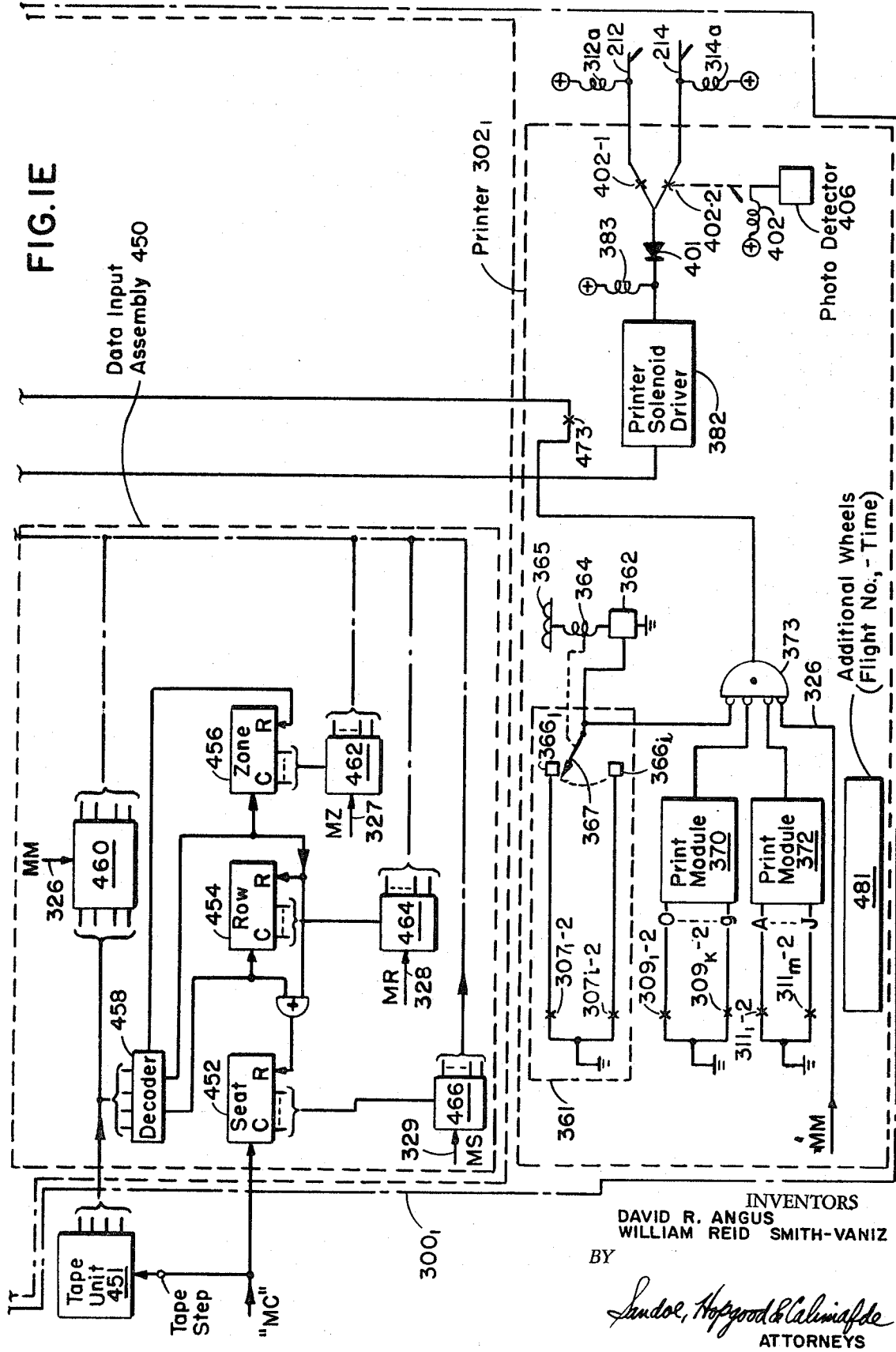

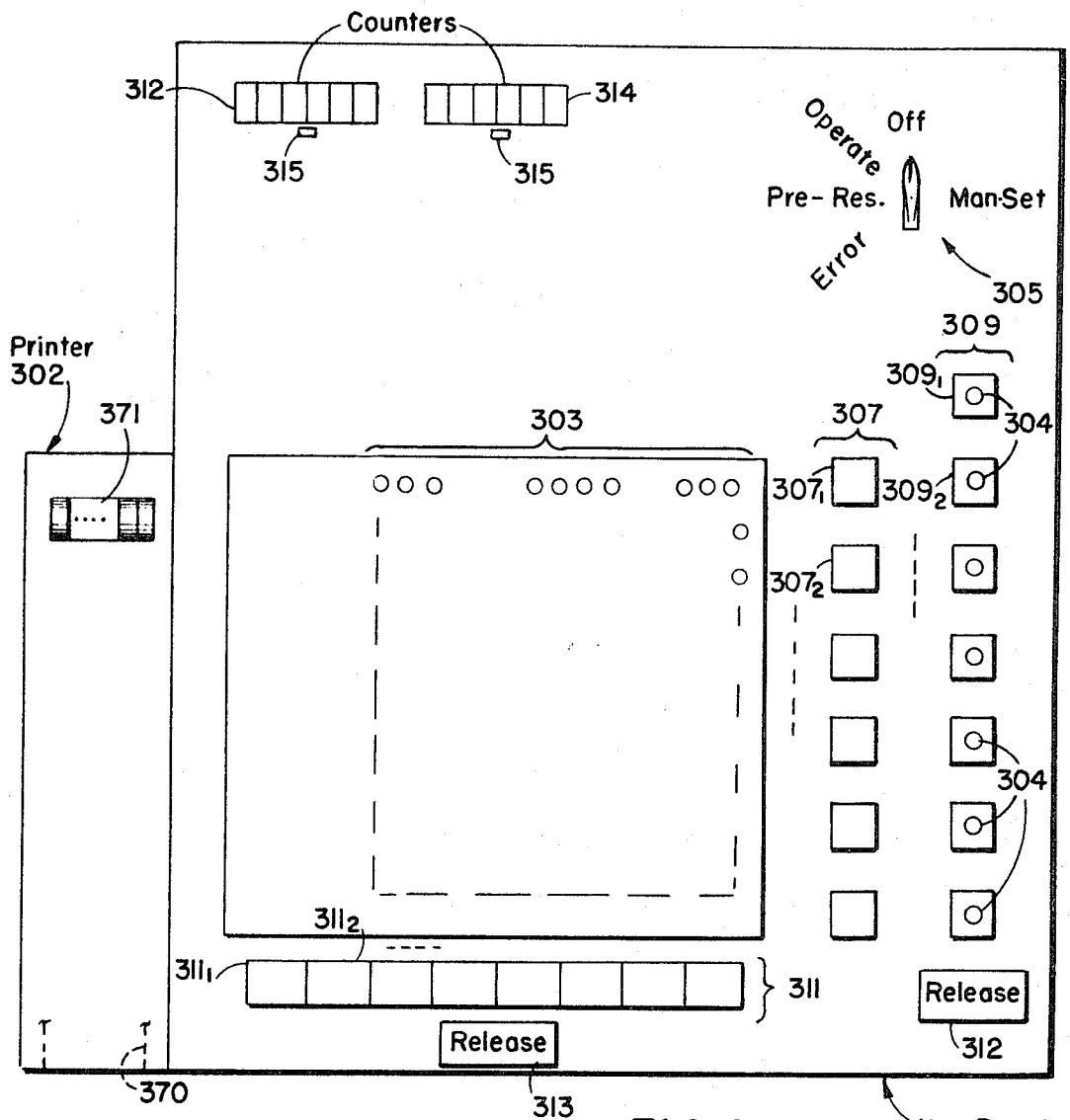
FIG.2
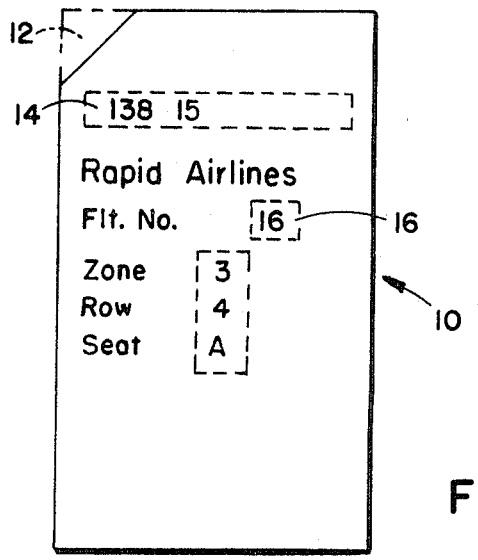
FIG.3
| FIG.1A | FIG.1C | FIG.1D |
| --- | --- | --- |
| FIG.1B | | FIG.1E |
FIG.5

INVENTORS
DAVID R. ANGUS
WILLIAM REID SMITH-VANIZ

ELECTRONIC SYSTEM EMPLOYING PLURAL PROCESSING STATIONS FOR ISSUING AIRLINE BOARDING PASSES WHILE EFFECTING SEAT ASSIGNMENTS, AND GENERALLY FOR PARCELLING ELEMENTS OF AN ORDERED SET

This invention relates to digital computing systems and, more specifically, to digital circuitry employed, for example, as an aircraft boarding pass-seat assignment dispensing system.

BACKGROUND OF THE INVENTION

Procedures for parcelling available, unique elements of an ordered set have presented difficulties in practice and have often been conducted in a less than satisfactory manner. An example of set parcelling comprises the procedure at an airport boarding gate, where numbered seats for an aircraft are distributed to passengers upon issuing a boarding pass. For any given flight, some model or tubular listing of the available aircraft seats is prepared, the seat array varying for the particular aircraft equipment, its modifications, dedicated and pre-assigned seating, (e.g., for stewardess), and the like. An attendant at the gate typically processes passenger and seriatim, issuing boarding passes and assigning seat locations on an availability basis, keeping a running record of those seats which remain available.

However, this current practice suffers several deficiencies. First, and importantly from the standpoint of passenger convenience, the procedure is amenable to only a single boarding station where the seat availability information is available. This results in passenger delay in boarding, a difficulty which has become more pronounced when several hundred people board the newer and larger commercial aircraft.

Multiple passenger processing stations are one solution to expediting passenger boarding. However, to prevent inadvertent multiple assignments of the same seat, the aircraft seats must be prealloted among the several stations, resulting in a lesser choice for each passenger. Further, unless the passengers are processed at the stations in the exact proportions as the seat allotment, a heavily loaded aircraft will give rise to situations where some stations are effectively removed from service after their seat allotment is exhausted, thus delaying boarding. In addition, where plural boarding stations are employed, it would heretofore have been difficult to maintain a running total of passengers boarding the aircraft and more specifically to maintain a record of passenger count in the several tariff classifications of the aircraft (e.g., first class, tourist and the like), to serve as a verification for an actual count made onboard, and for other business purposes.

The set parcelling process has been described above in an airliner boarding-seat assignment context. Other practices of this procedure are of common experience, e.g., room assignment in hotels and motels, theater and sports ticket distribution, and sales-inventory maintenance of ordered, nonfungible merchandise, among many others.

It is thus an object of the present invention to provide improved apparatus for distributing elements of an ordered set.

More specifically, it is an object of the present invention to provide digital electronic circuitry for allotting elements of an ordered, programable set at a plurality of stations therefor, the stations each having undivided access to the full set, and wherein no element of the set can be coincidentally seized by more then one station.

It is another object of the present invention to provide a multiple station set distribution system wherein cumulative totals are developed and displayed at all stations for each of plural subset classification.

It is a still further object of the present invention to provide set parcelling apparatus employing central processing equipment and a plurality of system busses, wherein plural parcelling stations as required may be connected in parallel to system bus lines.

Yet another object of the present invention is the provision of multiple station, set distribution apparatus, wherein each station includes a continuously updated data outputting peripheral unit for providing a printed record upon allotting any set element.

It is another object of the present invention to provide multiple station set distribution equipment for automatically seizing a portion of the set during availability interrogation to ensure uninterrupted access to the seized set portion.

It is a specific object of the presnet invention to provide an improved vehicle boarding pass - seat location assigning system.

SUMMARY OF THE INVENTION

The above and other objects are realized in a specific, illustrative embodiment thereof, employed to issue airline boarding passes while effecting aircraft seating assignments and passenger count by class of service. The system arrangement includes a central processor unit which periodically and cyclically communicates via system busses with a plurality of passenger accommodating stations each comprising a keyboard selector switch assembly and display unit, and an alphanumeric printer associated therewith.

The central porcessor includes a circulating memory for storing digital information characterizing the availability of all seats on the aircraft. The processor also includes the system clock, circuitry for sequentially and bilaterally polling the several keyboard stations on a time multiplexed basis, and logic circuitry including, inter alia, apparatus for selectively modifying the memory contents, and for enabling the system printers.

Each keyboard unit includes an array of lamps for indicating the status of all seats in a section (herein: zone) of the aircraft selected by an array of zone selector switches. This permits a passenger to select a desired area of the aircraft for viewing seat availability. An illuminated and dark lamp in the lamp array respectively represent available and unavailable seats, and an intermittent flashing glow identifies a prereserved but unclaimed seat.

Information descriptive of the aircraft configuration is read into the circulating memory to define the initially available seat configuration. Passengers at the several system stations request a display of a portion of the airplane within their tariff classification, and a latching display of the requested area is initiated in the keyboard unit at that station. The display request, in common with all other communication and signaling between a keyboard unit and the central processor, is accommodated on a time-shared basis. However, the cyclically repeating station scanning rate is made sufficiently fast (e.g., fifteen times a second) such that results appear instantaneous within the limits passenger perception.

A passenger viewing the display selects a row within his chosen zone, this being accomplished via a plural row selection switch. That row is effectively seized for the request - issuing station, making it unavailable to any other station. This prevnets interference with seat selection, as where a group of passengers desire adjacent seating. Finally a seat is selected by seat selector switches on each keyboard unit.

The printer at the operated keyboard unit tracks the active zone, row and seat selector switches. When an available seat is requested, a boarding pass inserted in the printer is marked with the selected seat identity without any delay otherwise attendant to rotating printer character wheels. The central processing unit responds to a seat selection by designating that seat as unavailable in the circulating memory.

Counters are provided at each station and interconnected by system busses to track the number of seats issued for each class of service by any of the keyboard units.

BRIEF DESCRIPTION OF THE DRAWINGS

The above and other features and advantages of the present invention are realized by a specific illustrative embodiment thereof, discussed in detail hereinbelow in conjunction with the accompanying drawing, in which:

FIGS. 1A-1E depict in schematic form an aircraft boarding pass-seat assigning digital system embodying the principles of the present invention;

FIG. 2 illustrates the operative panel of a keyboard unit employed in the system of FIGS. 1A-1E;

FIG. 3 depicts a boarding pass prepared by the system of FIGS. 1A-1E;

FIG. 5 illustrates the spatial arrangement of FIGS. 1A-1E.

DESCRIPTION OF THE PREFERRED EMBODIMENT

Figure 1C:
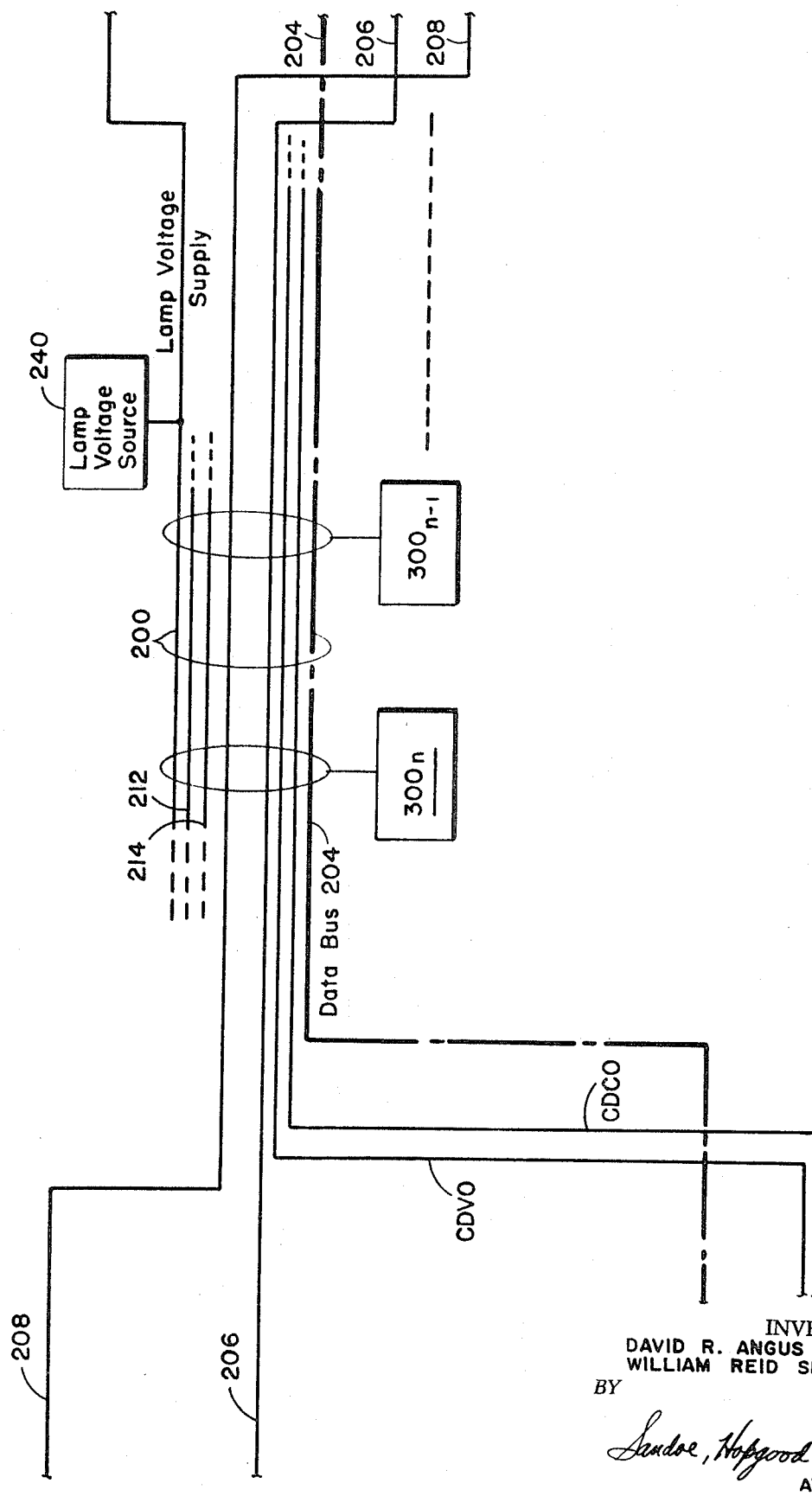

Referring now to FIGS. 1A through 1E, hereinafter referred to as composite FIG. 1, there is shown in schematic form a digital electronic system for issuing airline boarding passes, and for effecting aircraft seat assignments. The arrangement comprises a central processor unit 100 connected via a plurality of system busses 200 to a plurality of operator console stations $300_1 - 300_n$ each of which includes a keyboard unit 301 and a digital printer 302.

In operation, the central processing unit 100 sequentially and cyclically communicates with ("polls") the several on-line attended consoles 300 on a time-shared basis. The scanning rate between the central processor and the console is made sufficiently rapid (e.g. one-fifteenth of a second) such that all data requests made by an attendant at a console appear to be instantaneously operated upon from a human perception frame of reference.

The operative panel of a keyboard unit 301, and the printer 302 associated therewith, are shown in FIG. 2, and a boarding pass 10 issued by the composite FIG. 1 system, and by a system printer 302 in particular, is shown in FIG. 3. The pass 10 has illustratively printed thereon a date field 14, a flight number identification field 16, and a seat designating field 18 comprising a section (zone) of the aircraft, a row within that zone and a seat within the row. The boarding pass 10 is of rectangular form for tourist class service, and has a removed corner portion 12 for first class service.

The console 300 located at each of the several passenger processing stations includes an array of lamps 303 disposed in matrix form (see FIG. 2), each of the lamps conceptually representing a corresponding seat in a selected zone of the aircraft. Each row of lamps corresponds to a row of seats in a zone of the aircraft selected by a plurality of zone selector switches $307_i$. The number of lamps in both linear dimensions of the array 303 is made sufficiently large to accommodate the largest aircraft seating capacity and arrangement.

keyboard unit 301 includes a mode selection switch 305 for selecting a mode of operation desired for the keyboard unit 300. When servicing boarding passengers in a routine manner, the mode switch 305 normally resides in an "OPERATE" position. With the switch 305 so disposed, a passenger indicates to the console attendant his preference for seating in a particular zone of the aircraft. The operator then depresses one of the set of zone selection switches 307 corresponding to this aircraft section. Responsive to this zone request, and during the time interval when the console station is next connected to the central processor unit 100, the lamps 303 on the keyboard 301 become selectively illuminated to depict seat availability for all seats within the selected airplane section. In particular, and in accordance with illustrative seat availability signaling, an illuminated bulb identifies an available seat; a dark bulb signifies a seat which has already been allotted; and a flashing lamp denotes a prereserved but as yet unclaimed seat.

Upon viewing the seat availability pattern the passenger next indicates to the attendant a row within the selected zone in which he desires to sit. The attendant then depresses a corresponding one of an array of row selector switches 309. This has the operative effect (when the row request is next accommodated by the central processor unit 100) of seizing the selected row for the row requesting console 300 such that no other console may claim a seat in that row. A lamp 304 included as an integral part of each row switch 309 is illuminated to indicate that one of the keyboard units is processing a seat request in that row, and that the row is therefore not available to any other station until such processing has been completed. This mode of operation eliminates race conditions between the keyboard units, and also permits a subscriber at the console requesting that row to take a number of adjacent seats without having another console unit interrupt the desired contiguous seating pattern.

Finally a passenger specifies a particular desired seat within the selected row by depressing one of an array of seat selector switches 311. When the attendant then inserts a blank boarding pass form into a ticket receiving orifice 370 of the digital printer 302 at that console station ( or if a pass was already present then), the desired seat location is stamped on the pass with other appropriate information, such that a ticket of the form shown in FIG. 3 is generated. The printng mechanism is adapted to continuously track the seat selector switches 307, 309 and 311 such that the seat request is processed almost instantaneously when the boarding pass is positioned in the printer orifice 370, and all conditions for seat allotment are satisfied. The date and flight information for the printer 302 is generated by setting thumb wheel switches 371 located on the printer.

The console unit includes two electrical counters 312 and 314 for counting the total number of first class and tourist passengers boarding the aircraft independent of which console station issued the boarding passes. Accordingly, each time a boarding pass is issued at any of the system consoles 300, a signal is generated on one of the system bus lines 200 to activate the appropriate one of the printers 312 or 314 at each console station depending upon the class of service for the boarding passenger.

For a complete aircraft boardng cycle of operation for the composite system of FIG. 1, a mathematical model describing seat availability characterizing the aircraft for a given flight is read into a memory contained in the central processor unit 100, either by repetitive manual operation of the mode switch 305 and selector switches 307, 309 and 311, by connecting a data input assembly 450 (e.g., a magnetic tape unit) to one of the keyboard units 301. The counters 312 and 314 are cleared before passenger boarding commences, as by manually depressing counter clearing buttons 315 thereon, and the thumb wheel switches 371 are set to proper positions.

The keyboard units $301_i$ are electronically uniquely numbered and cyclically polled by the central processor unit 100. Integral to the seat reservation procedure, zone selection switches 307 are depressed at the consoles 300, and seat availability of those aircraft zones is displayed on the lamp matrices 303 at the corresponding consoles. When sufficient information has been inserted into any console $300_i$ to select a seat, viz., when a zone, row and seat switch of the switch arrays 307, 309 and 311 are depressed; when the desired seat is available; and when a boarding pass form has been inserted in the orifice 370 of the printer 302 at that station; the central processor 100 issues a print command and allots the seat. The processor 100 also changes the status of that seat in its memory so that the seat will not be redundantly issued.

The seat and lamp 303 display requests are processed during the portion of the overall cyclic scanning period when the console 300 requesting the seat is functionally connected by the system busses 200 to the central processor unit 100. Further, each time a seat is issued by any console 300, an appropriate one of the counters 312 and 314 at each keyboard unit 301 is advanced depending upon the class of serve for the issued pass.

Circuitry is provided in the system to provide various control functions, and tr overcome human and mechanical errors, or changing circumstances. For example, with the mode switch 305 in the ERROR position, and a zone, row and seat switch depressed, the seat availability information for the identified seat within the central processor memory is returned to available status independent of its former state, e.g., when a passenger changes his preference. Similarly with the console mode selector switch 305 in the manual set (MAN-SET) and prereserved (PRE-RES) positions, a seat fully identified seat by the switch arrays 307, 309 and 311 is respectively made unavailable or reserved in the central processor memory.

Further a release lamp-actuator button 312 located on the keyboard unit 301 is illuminated if an attendant engages a row switch to select a seat row which has previously been seized by another console. An illuminated release lamp 312 signals the attendant that he must depress the button 312 to mechanically release the improperly depressed row selection switch any well known release linkage being employed between the button 312 and the switches 309. Correspondingly a lamp 313 is illuminated when a console 300 requests a seat which is not available, thus signaling that another selection must be made.

The particular functioning of the several system circuit portions considered by way of overview above will now be considered in detail, both as to their structure and their cooperative mode of operation. The central processor 100 includes a circulating memory 130 for storing availability information characterizing all of the seats of a subject aircraft. The procedure for inserting this information into the memory 130, both manually and from an information storage medium, is discussed below. The circulating memory 130 comprises a delay line 134 receiving its input from the output of a plural stage shift register 136. The output of the delay line, 134, in turn, is supplied to the data input terminal of the shift register. Data is stepped through the shift register (and thereby the delay lines) at a rate determined by a system clock oscillator 101. The stored information thus repeatedly cycles through the delay lines 134 and the shift register 136 at a rate given by the oscillator frequency.

Figure 4A:
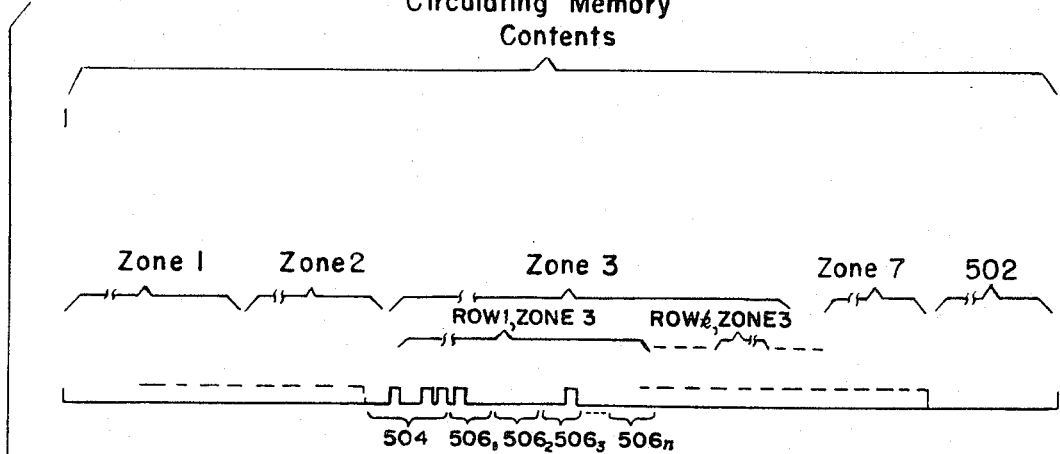
FIGS. 4A-4D are timing diagrams characterizing the system of FIGS. 1A-1E.

The contents of the circulating memory 130, which serially appears at the output of each and all of the shift register stages, is depicted in FIG. 4A. This information may be conceptually viewed as a series of data bits charterizing the seats for each of the zones of the aircraft (assumed to be a maximum of six zones for concreteness), followed by a terminal memory portion 502 which does not contain seat availability information. When the memory portion 502 is in an operative position within the circulating memory 130 for reading, viz., when this part of the memory contents circulates through the shift register 136 and appears at the output terminals thereof, the system effects its administrative chores. Important among these chores, and as discussed in detail below, during this interval a particular cone of the keyboard consoles 300 is selected for all necessary servicing by the central processor 100.

The memory contents for zone 3 of the aircraft, illustrative of the other zones, is shown in detail in FIG. 4A. The zone 3 information is in turn subdivided into a plurality of data segments associated with each of the $k$ rows within zone 3. The data corresponding to one of the rows within zone 3 viz., the row 1, is illustrated in detail in FIG. 4A and comprises a first field 504, of four digits width, which identifies which, if any, of the consoles 300 has depressed its switches $307_3$–$309_1$ corresponding to row 1 of aircraft zone 3 to seize this row for seat selection, thereby rendering the row unavailable to any of the other consoles as discussed above. If the row is not being interrogated by any console 300, the data portion 504 is blank (all zeros). The particular digits, if any, located in the data field 504, uniquely correspond to and specifically identify one of the consoles.

The remainder of the information within the memory contents corresponding to row 1, zone 3 comprises a plurality of two bit bytes which sequentially characterize the availability of a different seat in the row. The data byte $506_1$ is illustratively shown with the digital pattern "01" which may indicate, for example, that the first seat in the row is available; the byte $506_2$ is "00" indicating that the seat is not available; and the byte $506_3$ is "10" to identify a prereserved seat. The last byte $506_m$ of the row is shown as having a nonavailable seat. Since memory 130 is designed to accommodate the largest anticipated aircraft, the terminal data fields in each of the row memory portions (and final rows within a zone) will typically be a sequence of zeros for any but the largest aircraft.

To provide timing for the composite system, and to correlate the seat availability information within the circulating memory 130 which is present at the memory output (the output of the plural stage shift register 136) with the seat having that availability, the system reference oscillator 101 supplies an output clock pulse train to a modulo N counter 102. The number of states for the counter 102 ($2^N$) is made equal to the number of digits stored within the circulatory memory 130, so that the counter recycles at exactly the same rate as the memory 130. Such synchronization is in part maintained by the oscillator 101, which advances both the counter 102 and the memory shift register 136. Each count state for the counter 136 uniquely corresponds to and identifies to particular data within the memory 130. Thus, as described in greater detail below, information regarding any seat may be derived by examining seat availability signals at the output of the register 136 at a time determined by decoding the output of the counter 102.

With reference to FIG. 4A, it is noted that the circulating memory contents are cyclic in nature and comprise zone designations as major subdivisions; cyclicly repeating row designations within each zone (and between zones) as a parameter of intermediate significance; and seat designation each cyclicly recurring for each row and for each zone as the least significant designations. Correspondingly, the most significant digits of the Modulo N counter 102 comprises zone identification signals; the digits of intermediate significance correspond to row designating information; and the least significant counter output digits correspond to seat information. There is also developed a signal OSC/2 at the least significant counter stage which comprises an output square wave having a frequency corresponding to the oscillator 101 frequency divided by two for the purposes discussed hereinafter.

FIG. 4A depicts the information flow which continuously recirculates in the memory 130. The figure may thus also be viewed in the time domain, wherein each stored information memory portion gives rise to periodically recurring time intervals, while the entire memory contents corresponds to a cylically recurring operational interval. As set forth in greater detail below, the processor 100 is connected in turn to each of the system consoles 300 for a period equal to one full circulation of data in the memory 130. Console selection is effected during the adminstrative interval 502, and data transfer and other console servicing is then accomplished until the interval 502 next appears at the output of the shift register 136. Thus, the on-line consoles 300 are polled in turn for one circulation interval for the memory 130, beginning with the period 502.

The central processor 100 includes structure for generating a sequence of control signals which are supplied to selected system busses 200 for control and signaling purposes, and to interrogate the status of a selected console 300. This procedure occurs during the administrative portion 502 of FIG. 4A. In particular, the central processor unit 100 develops a single pulse (DSAMP – FIG. 4B) which is impressed on a system bus 206 during the beginning portion of the repetitive time interval 502. During the DSAMP pulse, each of the console keyboard units 301 examines the digital pattern on a plurality of data busses 204 to determine whether it is the console to be next serviced by the central processor unit 100. The selected console 300 is thereby operatively connected to the central processor, and is conditioned to receive further commands from the central processor unit 100 while all other system consoles 100 remain inert.

The central processor 100 also generates a signal (FIG. 4B) comprising a fixed number of output pulses, e.g., the pulses 520 – 524, each of which initiates a different communicative function and mode of interaction between a console 300 and the central processor. During the pendency of the DSAMP pulse and the CPCO pulse 520, a particular system console station 300 is selected. During the interval between the trailing edges of the pulses 520 and 521, the selected console 300 communicates its operational status to the central processor via signals impressed on the data bus 204, e.g., digital signals indicative of the position of the mode selector switch 305 (FIG. 2), and whether or not a boarding pass 100 resides within the printer 302 of the selected console.

During the interval ending with the trailing edge of the pulse 522, zone information (the identity of the depressed one of the zone selector switch array 307) is forwarded to the central processor unit 100. Similarly during the corresponding intervals bounded by the pulses 523 and 524, the status of the row and seat switch arrays 309 and 311 at the operative console is communicated to the central processor unit 100 via the system busses 200.

The CPCO and DSAMP pulses are generated during each operative repetitive timing cycle during which one of the consoles 300 is connected to the central processor 100. Each DSAMP pulse corresponds to one complete circulation of data in the memory 130, and one complete cycling of the modula N counter 102 (corresponding to $2^N$ pulses supplied by the master oscillator 101). Moreover the CPCO and DSAMP pulses are always generated at the same relative time in the cycle when the circulating memory portion 502 appears at the output of the shift register 136. Accordingly, the DSAMP pulse is generated by a timing-decoding network 122 which decodes the requisite output configuration from the modulo N counter 102 which corresponds to the initial portion of the interval 502. The timing-decoding network 102 may include for this purpose, for example, a simple coincidence gate supplied with the most significant counter 102 digits to decode the state corresponding to the memory portion 502, and sufficient row and seat count digits to define an output pulse at the beginning of this period. Similarly, the CPCO pulses may be generated by decoding five intervals defined by the output of the modulo N counter 102, as by five coincidence gates each supplied with zone, row and seat digits from the counter 102. The timing decoding network 122 thereby supplies five pulses via a plurality of leads 133 to a disjunctive gate 124, each of the pulses occurring at a time corresponding to a different one of the pulses 520 – 524 of FIG.

4B. The output of the gate 124 will thus comprise the CPCO waveform shown.

As used herein, OR-gates are used for disjunctive logic, and AND-gates are employed for coincidence logic. It will be readily appreciated by those skilled in the art that NOR, NAND and other logic structures may be used singly or in a proper combination to produce the required logic function.

To identify a selected one of the consoles 300, the central processor unit 100 includes a modulo C console selector counter 126, where $2^c$ is a number equal to or greater than the maximum number of console stations 300 employed in the system. Once during each cycle for the system counter 102, and at the beginning of the time period 502, the timing decoding network 122 supplies a pulse (as from a state decoding coincidence gate) to the count input of the counter 126. The output state appearing at the several stages of the console selector counter 126 is thus updated at the beginning of the administrative timing interval 502 to select a console identified by a number cyclically one higher than that selected during the previous cycle for the system.

During the console selecting interval of the time period 502 (during the DSAMP signal and the CPCO pulse 520 of FIG. 4B) the output signals from the counter 126 are gated by a gate 130 (e.g., formed of a plurality of AND-gates 131) onto the data bus lines 204. As discussed below in conjunction with a console 300, the keyboard units 301 at the system console respond to these signals for determining whether it is the station to next be operatively connected to the central processor 100.

Figure 4C:
Figure 4D:
Figure 4B:
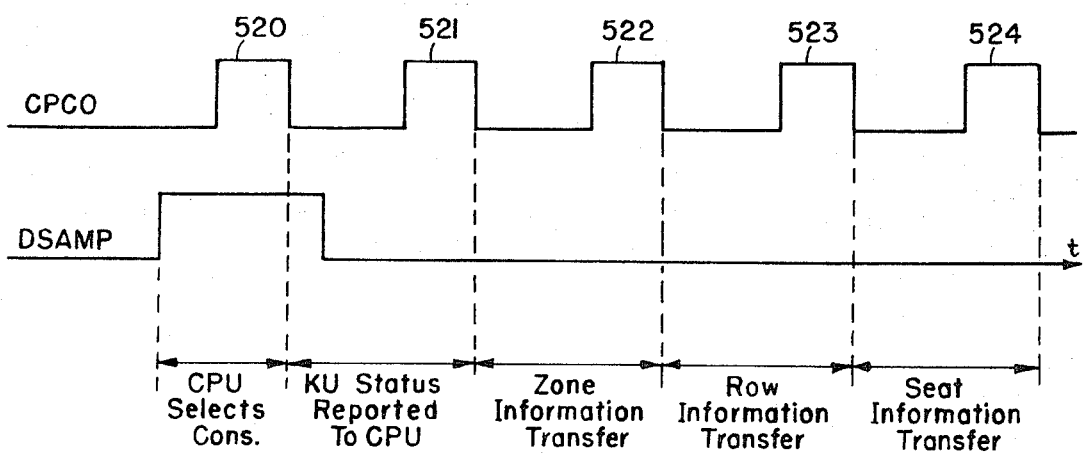

The structure in the keyboard units 301 and, in particular, the unit $301_1$ shown in detail in FIG. 1 and illustrative of the other like units, will now be considered with respect to implementing the control functions depicted in FIG. 4B. At the beginning of the administrative interval 502, the DSAMP pulse partially conditions an AND-gate 323 in each of the keyboard units 301 connected to the system busses 200. Also, during the first CPCO pulse 520, an AND-gate 318 in each console is partially enabled. The data bus lines 204 are connected to the remaining inputs of the AND gate 323 by a like plurality of switching elements 322 each of which connects one of the lines directly or via an invertor 324 to the corresponding AND-gate 323 input, the selection being made by the setting of a transfer switch 325. Accordingly, the setting of the switches 325 in the switch units 322 determines the binary numerical identity of the console 300. Thus, for example, if all of the switches 325 in the switching units are connected to the data bus lines directly, the AND-gate 323 will respond to a console identifying digital pattern of all digital "1's" (giving the station an identity of 1111 or decimal sixteen where four console identity digits are employed). Similarly, with all switches 325 connected to the output of the invertors 324, the AND-gate 323 will respond to a digital pattern of all "0's" hence identifying the console as the decimal zero unit. Further, other mixed distribution of the switch settings are employed to characterize the console as designated by any intermediate 00–0 and 11–1, the zero designation not being used in practice.

When the console $300_1$ is to be selected, its identification number is present on the data bus 204 and, accordingly, the gate 323 is fully enabled during the DSAMP interval and supplies an output pulse at this time which passes through an OR-gate 315 to the count input of an initially reset divide-by-5 counter 317. The output of the counter 317 therefore advances to the one state (001 output) which is supplied to a digital decoder 325 and also to an OR-gate 326. The output of the OR-gate 326 becomes high by reason of the binary "1" digit at on-counter stage, this enabled output of the gate 326 comprising a console "ME" signal signifying that the keyboard unit $301_1$ is in fact the unit selected for processing selected by the central processor 100.

The voltage transient at the output of the switched OR-gate 326 develop when the keyboard unit $301_1$ is selected is differentiated by a differentiator 329 thereby which supplies an inhibit control pulse to a latching gate 330. Responsive to the inhibit pulse supplied thereto, the gate 30 is momentarily rendered nonconductive, and blocks lamp 303 energizing potential quiescently supplied from a source 240 thereof to one terminal of each lamp in the array 303 at that console keyboard by a conductor 352. This momentary interruption renders a plurality of latching semiconductor switches 335 nonconductive to clear the lamp of any seat pattern display.

Accordingly, following the DSAMP pulse and the CPCO pulse 520, the console $300_1$ and particularly the keyboard unit $301_1$ thereof, have determined that it is the selected station for the next cycle of central processor operation and memory circulation, as manifested by the presence of the ME signal; the "1" state for the counter 317; and the cleared state for the lamp matrix. It is observed, however, that system operation is sufficiently rapid that an observer viewing the lamp ensemble 303 cannot detect its reset, unilluminated state since a new pattern is quickly implemented, as discussed below.

As indicated in FIG. 4B, the selected keyboard unit $301_1$ communicates the status of its mode selector switch 305 to the central processor unit 100 in the interval following the CPCO pulse 520. In this regard the mode switch 305 on the panel of the keyboard unit $301_1$ employs a first series of normally open contacts $305_1$-1 through $305_5$-1 one of which is closed when the mode switch resides in a corresponding mode selecting position. That is, for example, the contacts $305_1$-1 and only these contacts of the array 305-1 are closed when the mode switch is in the OFF position; contacts $305_2$-1 are closed when the switch is in the MAN-SET position, and so forth, the contact $305_5$-1 being associated with the OPERATE mode switch position, which is the only position in which boarding pass printing is desired.

In the mode switch reporting interval following the control pulse 520 of FIG. 4B, the "1" count state for the counter 317 is decoded by a decoder 325 which supplies an output potential at this time on a line 326 connected to the "1" decode output terminal of the unit 325. This voltage level is supplied to one input terminal 329 of a digital encoder 330. The particular input terminal receiving the mode pulse depends upon the particular one of the contacts 305-1 which is closed, and therefore upon the setting of the mode switch 305. Thus with the interconnection pattern of the drawing, the upper encoder input 329 (marked "1") is energized with the switch 305 in the OFF position; the encoder input "2" energized with the switch 305 in the MAN-SET position (contacts $305_2$-1 closed) and so forth. The encoder input terminal 329 designated "6" is energized when the mode switch 305 is in the OPERATE position, but only when all of the conditions required for printing a boarding pass at printer 302₁ are met (print wheels set — an output from AND-gate 373; and boarding pass 10 in the printer — closed contacts 473).

The encoder 330 produces a digital encoding (e.g., BCD code) on an array of output lines 331 which identifies the particular input terminal thereof which has been energized. The digital pattern on the output lines 331 then passes without change through data converging OR-logic 332 and is impressed on the data bus 204 for communication to the central processing unit 100.

The timing decoder network 122 in the central processor unit 100 produces a timing signal disposed within (or concomitant with) the console status reporting interval of FIG. 4B, this signal being developed on a line 194 which enables a gate 121. The opened gate 121 thus passes the encoded mode switch signals on the plural data buss 204 conductors to a mode register or latch 190 which attains a state given by these signals. The gate 121 may comprise a plurality of AND-gates such as that shown for the gate 130. It is observed at this point that a plurality of gates 120, 119, 118 and 130 are blocked at this time, and thus the data on the bus 204 passes only to the intended register 190. In a like manner, and for the purposes discussed below, these system gates are opened at differing times or from one another to perform appropriate data distribution functions associated therewith. In this manner system signals may translate between sending and receiving elements without interference from other system elements connected with the buss group.

A digital decoder 192 is connected to the mode register 190 and energizes one of the outputs thereon dependent upon which particular operational mode is being effected by the system as represented by the stored mode switch encoding. The voltage level present at one and only one of the decoder 192 output terminals provides a record for the duration of a full operative cycle for the central processor unit 100 which identifies the mode of service requested of the central processor unit 100 by the selected keyboard unit 301₁.

Following the second CPCO pulse 521, the counter 317 in the console 301₁ advances to a count of two, which is decoded and produces an output signal on a line 327. The line 327 is connected to one terminal of a plurality of normally open contacts 307₁-1 through 307ⱼ-1 with one of these contact pairs being closed depending upon which of the zone switches 307 (FIG. 2) is depressed. Thus, for example, where the zone selector switch 307₁ is depressed when a passenger indicates that he desires to sit in zone 1 of the aircraft, the contacts 307₁-1 are closed.

During the zone information transfer time interval shown in FIG. 4B (following the pulse 521), the signal on the conductor 327 passes through the closed one of the contacts 307-1 to one of the encoder 330 input terminals 329. The encoder 330 produces a particular and distinct output encoding responsive to the particular energized input terminal thereof. The output encoding passes through the gate 332 onto the data bus 204 for transfer to the central processor unit 100.

During the zone information transfer interval, the timing decoding network 122 supplies a signal to a conductor 193 for opening the gate 118, thereby inserting the encoded zone information into a zone register 116. The output from the zone register 116 is supplied as one digital input quantity to a zone digital comparator 109.

In a similar manner row information is transferred to the central processor 100 during the interval therefor shown in FIG. 4B. During this row information period the signal present on a conductor 328 passes through one of a plurality of row contacts 309₁-1 through 309ₖ-1 dependant upon which one of the row switches 309 (FIG. 2) have been depressed if any. The contact closure in the group 309-1 is encoded by the unit 330, impressed on the data bus 204, and passed through the gate 119 (enabled by a timing signal on conductor 192) to be stored in a row register 114. The output of the row register 114 is supplied as one set of input digits to a row digital comparator 107.

Similarly, following the CPCO pulse 523, an energized decoder 325 output conductor 329 passes a voltage to a closed contact pair of a group 311-1 through 311ₘ-1 depending upon which one of the seat selection switches 311 (FIG. 2) has been depressed, if any. The seat switch information is encoded, impressed on the data bus 204, and passes through an enabled gate 120 to a seat register 112, and therefrom to a seat digital comparator 105. Thus, following the pulse 523, all necessary information characterizing the selected console 300₁ has been registered in the central processor unit 100, viz., the mode of service desired, and the identification of the zone, row and seat if in fact all this latter information has been entered at the console.

Less than this full quantum of information may be communicated to the central processor unit 100. For example, during the milisecond interval when the station 300₁ is polled by the central processor unit 100, there may as yet have been no seat and/or row selection made. When this condition obtains, as is the general case, no meaningful seat selection operation will be effected, although the polling cycle is useful in generating a desired seat availability display.

The final CPCO pulse 523 advances the state of the counter 317 to a count of five, thereby producing an enabled HARK signal on a decoder 325 output terminal. This active state HARK signal characterizes the keyboard unit 301₁ as residing in an operational state, and is utilized as an enabling signal for various system purposes considered herein.

The zone comparator 109 is supplied with the most significant digits of the system counter 102 which identify the aircraft zone then presented at the output of the circulation memory 130. When the aircraft zone requested by a passenger by a zone switch 307, as stored in the zone register 116, matches the zone present at the circulating memory output a Zone Match (ZM) signal is produced by the comparator 109. Similarly, Row Match (RM), and Seat Match (SM) signals are respectively generated when, and only when, the row selected by the switch array 309 and 311 (stored in the registers 114 and 112) identically match the seat and row identified by the digital output of the counter 102. An AND-gate 110 is provided to generate an All Match (AM) signal when the specific seat in the aircraft identified by the contents of the register 112, 114 and 116 corresponds with the output of the counter 102. It is observed that when the register 112 contains seat information (one of the switches 311 engaged at the operative console) the seat match signal is generated once for each row when availability information for that seat is available at the output of the memory. Similarly, a row match signal is developed during processing for each zone of the aircraft.

The manner in which the array of lamps 303 at the keyboard unit $301_1$ is illuminated in accordance with seat availability in an area of the aircraft selected by an activated zone switch 307 will now be considered. When one of the zone switches 307 at the illustrated console $300_1$ is depressed, information identifying the desired zone is entered in the register 116 at the processor 100 when the console is next polled. Accordingly the zone comparator 109 generates a Zone Match output signal when availability information for that section of the aircraft flows past the memory output terminals. This zone match signal partially enables two AND-gates 150 and 152 during the time interval when seating information for the requested zone is accessible. The gate 152 has its other input connected to the OSC/2 signal, and thus the output from gate 152 (CDCO signal) comprises the clock signal at one half the clock rate which is present only when the desired zone is present at the memory output. FIG. 4C depicts this CDCO signal, it being assumed that the aircraft zone 3 has been selected by a console operator. The pulses in FIG. 4C are generated in synchronism with every other output from oscillator 101. Thus, one pulse appears in the CDCO pulse stream for each seat in the desired zone, since two stored information bits (and thereby two oscillator pulses) are required for each seat.

The seat availability information stored in the memory 130 comprises two digital bits for identifying the three possible seat states. This seat information is sensed in parallel from the upper two shift register 136 stages shown in the drawing. If the second identifying digit is a one (from the second register stage) indicating that the seat is available (see the seat availability code given above), an OR-gate 147 is activated and switches the AND-gate 150 to produce a pulse at the output of the gate 150 (CDVO signal). The presence of this video signal will turn the appropriate seat status light 303 on in the console $300_1$ in the manner discussed below. When the contents of the two upper register 136 stages are "00", the seat is unavailable, and no signal is supplied to the OR-gate 147. Accordingly, when this condition obtains, the AND-gate 150 is not switched and a zero level signal appears at the output of the gate 150 during the concomitant CDCO pulse. The absence of this pulse will result in a corresponding console lamp being off.

In accordance with the lamp state code, a one in the first of the two status bits (from the upper shift register stage) is supplied to an AND-gate 146. The other input of the gate 146 comprises the output of a decoder 133 which is driven by the most significant or overflow signal of the station selector counter 136 and further counter stages 132. The counter 132 advances its state every time each of the line systems has been polled. Thus, the AND-gate 146 is enabled by the counter and decoder 132 and 133 only during selected polling cycles for the central processing unit 100, and only during these cycles is the prereserved seat status signal allowed to pass through the AND-gate 146, the OR-gate 147 and the AND-gate 150 to enter the CDVO video digit stream to turn on a lamp in the matrix array 303. Hence where a seat has a prereserved status, its corresponding Finally regarding the transfer of lamp information to the keyboard unit $301_1$, information is provided to selectively illuminate a lamp 304 in a switch 309 to indicate that the corresponding row has been seized by one of the keyboard stations. To this end, a decoder 103 is connected to the seat digits of the counter 102 and repetitively provides a Seat Zero (SZ) output signal to identify the time when the digits identifying a station which may have seized a row (the field 504 of FIG. 4A) reside in the upper four shift register stages 136. This input is supplied as one enabling timing input to a AND-gate 145. When a row has been seized, the identity of one of that station, including at least one nonzero digit, is contained in the upper four shift register stages. Accordingly, an OR-gate 143 is enabled and switches the AND-gate 145 to generate a video pulse through the OR-gate 147 and AND-gate 150. This pulse is employed at the keyboard unit 150 to turn on the lamp 304 in the appropriate illuminated push bottom switch 309.

This composite CDVO lamp video information signal is shown in FIG. 4D. As a general proposition, each of the pulses in the CDCO timing pulse stream will correspond to a particular lamp in the matrix array 303 these CDCO being employed at the console to scan the lamp matrix. When an active level CDVO signal is present during a CDCO timing pulse, the corresponding lamp of the array 303 is turned on. Conversely, the absence of A CDVO pulse during a CDCO timing signal will give rise to a dark lamp.

the particular manner in which the lamp array 303 is illuminated will now be considered. The HARK signal at the operative keyboard unit $301_1$ is present during the interval when the zone 1 – zone 6 information (see FIG. 4A) is serially present at the output of the circulating memory 130. A fortiori, this signal is present during the zone 3 data flow this being the section of the aircraft assumed to have been requested by the passenger. Accordingly CDCO pulses (FIG. 4C) developed during zone 3 timing are passed through an AND-gate 352 in the unit $301_1$, and advance an initially cleared seat-row counter 341. Accordingly, the signals present at the counter terminals contain information sufficient to identify a particular set in the aircraft in the same manner considered above for the counter 102 at the central processor 100. The video information, i.e., the CDVO pulses which control the lamp state, are similarly passed during zone 3 timing through an AND-gate 345.

The most significant bits at the counter 341 ouptut correspond to row information which is decoded by a row decoder 343. The decoder 343 partially enables one of a series of AND-gates $348_1$ - $348_k$ depending upon which row in the aircraft zone 3 is then being processed. The gates 348 are sequentially enabled in turn ($348_1$ through $348_k$) as the state of the counter advances. Similarly, a seat decoder 342 decodes the outputs from the least significant counter stages. The decoder 342 partially enables one AND-gate 350 associated with a seat (column) of the matrix 303, the gates $350_1$ - $350_m$ being cyclically energized in turn as the counter 341 advances.

One row of lamps in the lamp matrix array 303 is shown in the drawing, each of these lamps being connected between a lamp energizing potential on the conductor 352 and ground via a controlled latching switch 335, e.g., of a silicon controlled rectifier type. Assuming these lamps to be in the first or upper row of the array 303, the output of the AND-gate 348₁ is coupled to one input of each of the AND-gates 350 and partially enables these AND-gates when and only when row 1 information (during zone 3) is signaled by the counter 341 and, moreover, only when the CDVO video signal indicates that a particular lamp in that row should be on. Thus, for example, the first lamp in the array 303 is turned on by an output signal from the gate 350₁ triggering the associated electronic switch 335 when row 1 (a proper output from decoder 343) and seat 1 (a proper output from the decider 342) are present to identify the first seat in the first row of zone 3, and when the CDVO level is high to indicate that the seat is available. If the CDVO signal were low during this time, this lamp would be skipped and will remain off. The other lamps in the first row are sequentially illuminated or not illuminated in turn as the least significant digits of the counter 341 advance in count.

Subsequent rows of lamps in the array 303 are sequentially examined and treated as above when the count in the most significant counter 341 stage is advanced by the CDCO pulse train. Each of the subsequent lamp rows is controlled by a different one of the AND-gates 348 whose output forms one input of an array of AND-gates comparable to the gates 350, the other inputs of these gates being the output of the seat decoder 342. The above described apparatus therefore generates a display at the lamp array 303 at the keyboard unit 301₁ in accordance with seat availability information stored in the circulating memory 130.

In addition to causing a display, the depressed zone switch in the array 307 (FIG. 2) also causes a zone printing module 361 in the digital printer 302₁ at console 301₁ to assume the corresponding position. For the assumed case, the number "3" will reside in an operative printing position. To this end, each of the zone selector switches 307$_p$ includes a second isolated set of contacts 307-2 each having one terminal thereof connected to ground. The other contact terminal is connected to a different terminal 366$_p$ which are sequentially engaged by a rotating print module commutating member 367. Rectified AC line potential 365 is supplied across a module print head stepping relay coil 364 and a controlled switch 362 to ground, the switch 362 being conductive unless ground potential is applied to the control terminal thereof via the module commutator 367. The commutator 367 is thus stepped by the energized coil 364 once during each half cycle of the AC power line (for full wave rectification) to advance the next terminal 366. The commutator 367 is mechanically coupled to the operative module print head so that the print characters similarly advance one position during each half cycle of the power line.

When the printer head reaches the desired position, in this case a position with the number 3 disposed in the active position, the commutator 367 engages the terminal 366₃, and is thereby connected to ground by the closed zone switch contacts 307₃-2. The commutator 367 thus disables the controlled switch 362 and prevents any further movement of the print head during succeeding low cycles. The printing module 361 remains in this state as long as zone 3 in the aircarft is selected by the corresponding switch 307₃, with the module 361 being in a proper position to print the character "3". In a similar manner printer modules 370 and 372, respectively associated with row and seat information, automatically and continuously track the row and seat requested by the passenger, these modules being controlled by second contacts 309-2 and 311-2 associated with the row and seat selector switches 309 and 311. The actuating mechanism for modules 370 and 372 is identical to that for the module 361, and is not shown in the drawing.

The output of the commutator 367 in each of the zone, row and seat printer modules 361, 370 and 372 is supplied as an input to the AND-gate 373 via inhibiting input terminals thereof. Further, the AND-gate is partially enabled by the line 326 during the keyboard status reporting interval of FIG. 4B following the CPCO pulse 520. During this interval, when all three of the printer modules are in a proper printing position, the AND-gate 373 is fully enabled and provides an output signal to this effect at its output. When a boarding pass is in the printer 302₁, a switch 473 is closed, either directly through mechanical actuation by a boarding pass 10 or indirectly via a pass-sensing photocell and photodetector which selectively engages the switching contacts. With the contacts 473 closed; when all print modules are at rest in a proper position to print zone, row and set information corresponding to that selected by the switches 307, 309, and 311; and when the mode selector switch 305 is in the OPERATE position (closed contacts 305-5), the OPERATE mode encoding signal is passed to the processor register 190 to issue a seat and boarding pass 10 if all other requisite conditions are met.

The printer further comprises additional modules 373 for printing "fixed" information such as date and flight number. This information is entered as by the thumb wheel switches 371 (FIG. 2) which directly ground the desired module terminal.

It will now be assumed that a passenger has selected a zone, row and seat; that the corresponding switches of the switch arrays 307, 309 and 311 have been depressed at the console 301₁; and that a boarding pass 10 resides in the printer 302₁. During the time interval corresponding to the period 502 of FIG. 4A when the console 300₁ is next polled, the central processor 100 is advised that the mode switch 305 at the unit 301₁ is in the OPERATE position. The mode information enters the mode register 190 and the seat, row and zone designations are impressed in the registers 112, 114 and 116. At the point during information circulation in the memory 130 when available information characterizing the desired seat is present at the output of circulating memory 130, an All Match signal is generated by the AND-gate 110 to partially enable an AND-gate 180. An output from the mode decoder 192 confirms that the mode switch was in the OPERATE position and thus further partially enables the AND-gate 180. Finally, if the seat is in fact available or pre-reserved as indicated by the output of the OR-gate 147, the gate 180 switches and generates a timed output PRINT pulse on one of the data buses 204 controlled as to duration by a timer 182.

At the keyboard unit 301₁, the PRINT pulse together with the HARK pulse switch an AND-gate 380 which triggers a print cycle initiating solenoid driver 382. Accordingly, current flows through a print solenoid coil 383 to cause the printer 302₁ to print all appropriate information on the boarding pass 10 present in the printer orifice 370.

In addition to causing printing, the central processor unit 100 changes the stored availability code for the selected seat then present in the upper two shift register 136 stages to the "00" code to mark that seat as being unavailable. This is effected by the SDC output signal of the gate 180 which writes zeros into the shift register stages, as via two OR-gates of a shift register preset input terminal OR-gate array 141. Such functioning may alternately be affected by opening a gate 183 via OR logic at this time.

Thus, by the above procedure, seats are assigned and boarding passes 10 are issued with the seat designation printed thereon, while the contents of the circulating memory 130 are continuously updated as seats are taken.

The case where an attendant at one of the consoles 300 selects a row which was previously seized by another station will now be treated. A comparator 179 compares the identity of the console currently being polled by the central processor 100 (signified by the output of the console selecting counter 126) with the identity, if any, of a console which has already seized the row as manifested by the four digits in the shift register 136 at the beginning of each row (the field 504 of FIG. 4A). When such an improper condition obtains, i.e., when (1) the row has been seized by a station (represented by the inverted output of an all-zero detector 174), (2) which is not the station 300 currently being polled (no match sensed by the comparator 179), and (3) the information at the shift register output is being examined at the beginning of a row as required for the field 504 (a Seat Zero (SZ) output from the gate 103 in coincidence with the Row Match and Zone Match (RM) and (ZM) signal), an AND-gate 176 is switched and sets a release lamp flip flop 128 which energizes one of the data bus conductors 204. This signal in coincidence with the HARK signal switches a gate 375 at the console 301₁ which illuminates the release light 312 on the console panel (FIG. 2) acting through a controlled switch 383. This light advises the attendant that he has selected an improper row, and he must release this row since it is currently available for seat selection only to another console. Similar apparatus (not shown) may be provided to actuate the lamp 313 to advise the attendant that he has selected a seat which is not available.

By way of further function of an administrative nature, a gate 169 marks the field 504 at the beginning of a row with the identity of a console 300 seizing that row, identity information being supplied by the console selector counter 126. The information is passed through the OR-gate array 141 to the shift register 136 under control of an AND-gate 120 during the Seat Zero (SZ) interval (the period 504) at the beginning of the desired row signalled by zone match and row match signals when the seat is available (as indicated by all zeros initially present in the field 504 sensed by the zero detecting gate 174). Further, circuitry is provided to release a row, as when a passenger has changed his mind, e.g., where a row switch 309 is depressed (causing writing in a field 504), followed by actuation of a different one of the row switches 309. To this end, an AND-gate 199 recognizes a coincidence between the polled console 300 and the identity of a station which has seized a row (data in the row field 504 during the seat zero signal), but whre there is no Row Match (RM). At such time, an output signal from the AND-gate 199 enables a gate 183 to pass all zeros from a register thereof 182 to the row field 504 via the OR-gates 141 to again make this row available to any requesting station.

The system counters 312 and 314 at each console station 300 are employed to register the number of tourist and first class (and/or other tariff classifications) boarding passes issued by any console 300. To this end, the output of the printer solenoid driver 382 at each console 300, e.g., that in the printer 302₁, associated with the console 300₁, is connected by an isolation diode 401 to normally closed and open contacts 402-1 and 402-2, and thereby to system counter buses 212 associated with tourist class service and 214 associated with first class service. When the output of the printer solenoid driver 382 provides a low impedance to ground to energize the printer solenoid 383 in the printer 302₁, and when a tourist class boarding pass is being issued, current for the counter 312 advancing coils 312a connected at each station of the bus 212 have a path from a source thereof to ground through the normally closed contacts 402-1, the diode 401, and the driver 382 in the printer 302₁. Accordingly, the count station for each of the counter 312 at all stations advances by one.

The printer includes a photo cell (not shown) and a photo detector 406 which are optically isolated by the upper left corner of the boarding pass 10 for tourist class boarding passes 10. However, when a first class pass is being issued, the removed corner 12 permits the photo source to irradiate the detector 406, thereby energizing a relay coil 402 which opens the contacts 402-1 and closes the contacts 402-2. Accordingly, at such time the system counter coils 314a are energized to advance to the first class passenger counters 314 via the buses 214, the contacts 402-2 and the diode 401 when printing is effected.

As a final system function, data must be read into the system. This may be done manually on a seat by seat basis. For example, to mark a seat as available, an attendant places the mode switch 305 in the ERROR position, and identifies a seat in the aircraft by depressing a zone, row and seat switch. When the console 300 is next polled by the central processor 100, this information is loaded in the central processor registers 190, 112, 114 and 116. Responsive to the stored ERROR mode, the mode decoder 192 at the central processor 100 partially enables an AND-gate 250, the gate 250 being fully switched when availability information characterizing the identified seat is present at the output of the shift register 136 as signalled by the All Match (AM) signal. At such time, the gate 250 enables a gate 162 which passes the "01" seat available code from a permanent register 156 therefor, and enters this seat availability status in the memory 130 via the OR-gates 141. Similarly, a seat may be marked as unavailable for identifying a seat with the console mode switch 305 in the MAN-SET position, the unavailable "11" code being passed by a gate 160 to the shift register 136 for such a system operation. Further, a gate 161 is operative to pass the "10" prereserved code to the register 136 via the OR-gates 141 when a seat is identified with the mode switch 305 in the PRE-RES mode setting. Thus, availability for an entire aircraft may be entered into the memory 130 by changing the mode switch at one or more of the console stations 300 on a seat by seat basis.

However, as a more expeditious way of entering data, a tape or other data storage medium, may be programmed with the initial availability information for seats for various aircraft seating configurations. The tape is loaded on a tape unit 451 having a tape drive and multi-track read head. The data supplied by the tape unit 451, together with the remainder of a data inputting assembly 450, supplies signals via the data buss 204 to the central processor unit 100 which in essence duplicates the signal pattern which would be supplied if an attendant wrote seat availability information into the circulating memory 130 on an ad hoc basis in the manner described above. This information comprises, starting with the second time interval of FIG. 4B, a mode signal for effectively defining seat availability, followed by zone, row and seat information to identify a particular seat exhibiting that availability. The asembly 450 comprises seat, row and zone counters 452, 454 and 456 which step through the array of seats in the aircraft, the output of the counters being gated onto the data bus 204 by gates 462, 464 and 466 during the proper timing intervals under control of the output of the timing decoder 325. The seat counter 452 is directly cycled by the ME signal generated each time the console $301_1$ is polled, and is thus in position to characterize another aircraft seat, while the row and zone counters 454 and 456 are advanced by the output of a decoder 458 which is responsive to zone and row information stored on the tape. Accordingly, the input assembly 450 supplies, in sequence, mode information to the bus 240 via a gate 460 responsive the conductor 326 being energized during the interval between the trailing edges of the CPCO pulses 520 and 521 of FIG. 4B; zone information from the output of the gate 462 between the pulse 521 and 522; row data via gate 464 between pulses 522 and 523; the seat information between the CPCO pulses 523 and 524 via the enabled gate 466. The tape unit is stepped by the ME signals generated at the beginning of console polling, such that a different seat is automatically characterized as to availability by the data inputting assembly 450 each time the console associated with the assembly 350, e.g. the unit $300_1$ of the drawing, is polled. As an illustrative repetition rate for the instant system, data for 15 seats may be entering into the circulating memory 130 each second from a single console station. Accordingly, data inputting for even the largest aircraft may be effected in a mere mattero of seconds.

Finally, it is observed that all flip flops and other latch circuits may be initialized at the central processor 100 and at the console 300 in any well known manner, e.g. by providing timing signals therefor from network 122; by differentiating the leading edge of the OSAMP pulse; and the like.

The above described system arrangement has thus been shown to issue boarding passes for an aircraft while effecting seat assignments in a preferred, improved manner accommodating all requisite system functions. Any desird number of consoles 300 may be connected to the system bus line to establish plural passenger processing stations, thus facilitating passenger boarding without delay. Also, seating is effected in an orderly manner with unlimited access at each station for all seats in the aircraft, and where a single seat cannot be inadvertently assigned to more than one party.

It is again observed that the system arrangement discussed in detail above may be employed for any application wherein uniquely identifiable elements of a set are to be distributed at a number of processing stations. Illustrative of such operations, the circulating memory may be loaded with information characterizing the availability of rooms in a hotel or motel complex. Each room is uniquely identifiable by a series of parameters corresponding to zone, row and seat location parameters for the air line context. For example, rooms can be identified by room numbers formed of any number of digits, each of the digits thus comprising a different set ordering parameter. Alternatively, the number system of rooms may be by building, floor, wing and room number, or the like. Any number of available status states or characteristics for such rooms may be stored in the memory, e.g. available, taken, reserved, multiple occupancy, and view, among others. Further, the system counters may monitor any desired information, e.g., total rooms taken, rooms by different rate classification, or the like. Rather than the boarding pass 10 of FIG. 3, the system printer 302 would issue room assignment documents.

It is to be observed that the above described system arrangement is merely illustrative of the principles of the present invention. Numerous adaptations and modifications thereof will be readily apparent to those skilled in the art without departing from the spirit and scope of the present invention.

What is claimed is:

1. In combination in a digital electrical system for issuing airline boarding passes and for effecting seat assignments in an aircraft, said aircraft seats being identified by a zone designation, a row within a zone, and a seat within a row, comprising a central processor, at least one console, plural conductor system buss means connecting said processor with each of said consoles, each of said consoles including a matrix array of lamps, a plurality of zone selector switches, a plurality of row selector switches, a plurality of seat selector switches, and a mode selector switch, console selector means for sequentially and cyclically selecting each of said consoles, a mode register, means for encoding the mode selector switch position at a selected console, means for inserting said mode switch encoding signals in said mode register, zone, row and seat registers in said central processor, means for inserting signals representative of siad zone and seat switches assemblies in said console in said zone, row and seat registers, respectively, a circulating memory for storing and cyclically presenting at output terminals thereof signals indicative of the availability of all aircraft seats, a system oscillator and counter for identifying the information present at said circulating memory output, and means responsive to an aircraft zone identified by said zone switch means for illuminating said lamp matrix array in accordance with said stored availability information in an aircraft zone selected by said zone selector switches.

2. A combination as in claim 1 wherein said lamp illumination means comprises means for decoding the seat availability information stored in said circulating memory, means for gating the decoded seat availability information corresponding to the selected zone of the aircraft to produce a lamp video signal, and means for illuminating said lamps at the console in accordance with said video information.

3. A combination as in claim 1 further comprising a digital printer at each console, said printer including a plurality of printing modules including modules each associated with a different one of said zone, row and seat selector switches, and means for positioning said associated print modules to a state corresponding to that dictated by said associated switch means.

4. A combination as in claim 3 further comprising comparator means for producing a comparison output signal responsive to a coincidence between selected outputs of said counter and said zone, row and seat switches, and means responsive to a comparison signal, to a particulr setting of said mode selector switch in a selected console and to availability information stored in said circulating memory for causing said printer to print.

5. A combination as in claim 4 further comprising means responsive to each print signal for changing the availability information in said circulating memory at a location corresponding to the seat identified by said counter to an unavailable state.

6. In combination in a digital electronic boarding system for allotting seats in an enclosure wherein said seats are subdivided into zones each corresponding to a different section of the enclosure, a central processor, at least one keyboard unit, buss means connecting each keyboard unit with said central processor, each of aid keyboard units including plural seat availability display elements, and a plurality of zone selector switches, a memory included in said central processor for storing availability information characterizing said seats in said enclosure, and means for illuminating said display elements in accordance with the availability information stored in said memory corresponding to the seating zone defined by said zone selector switches.

7. A combination as in claim 6 further comprising a digital printer associated with each of said keyboard units, a printing module associated with said zone selector switches at each of said keyboard units, and mans for continuously maintaining said print module in a state signaled by said zone switches.

8. A combination as in claim 7 wherein each of said zone selector switches includes an output contact pair, and said print module includes a commutator and plural discrete connection positions each electrically connected to the contact pair associated with a different one of said zone selector switches.

9. A combination as in claim 6 wherein each of said keyboard units further comprise a plurality of row switches for defining a row within seating zone selected by said zone selector switches associated therewith.

10. A combination as in cliam 9 wherein each of said keyboard units further includes a plurality of seat selector switches.

11. A combination as in claim 6 wherein said central processor includes means for sequentially and cyclically polling each keyboard unit for operatively connecting the selected keyboard unit for bilateral communication with said central processor via said buss means.

12. A combination as in claim 6 wherein said display element illuminating means comprises means for generating a serial video digit stream comprising availability information for each seat within the zone of the enclosure selected by said zone switches, means for generating a serial clock byte stream, counting and decoding means at each of said keyboard units responsive to said clock pulse stream for sequentially selecting each of said keyboard unit display elements, and means for selectively activating the display element selected by said counting and decoding means in accordance with said video signal.

13. A combination as in claim 12, further comprisng counter menas for sequentially and cyclically polling said keyboard units, and means responsive to said polling means for selectively producing intermittent illumination of selected keyboard display elements.

14. A combination as in claim 13, wherein said intermittent illuminating means comprises divider means for passing selected seat availability signals to said video digit stream only during selected polling cycles.

15. A combination as in claim 14, further comprising row and seat selector switches at each said keyboard units, means for sequentially and cyclically polling each of said keyboard units, said central processor including means responsive to particular activated ones of said zone, row, and seat switches at a polled keyboard unit for interrogating said memory to determine the availability of the seat identified by said switches, and means responsive to said seat being available for allotting said seat.

16. A combination as in claim 15, wherein said central processor further comprises means responsive to a seat being allotted by said seat allotting means for changing the status of said allotted seat in said memory to an unavailable status.

17. A combination as in claim 16, further comprising means for writing seat availability information into said memory.

18. A combination as in claim 17, wherein said seat availability writing means comprises a mode switch at each of said keyboard units, a plurality of availablity code registers at said central processor, and means responsive to the particular position of said mode switch at a polled keyboard unit for gating the contents of a selected one of said availability code registers to said memory, said memory address receiving said grated availability code information being defined by switching means at said polled console.

19. A combination as in claim 17, wherein said writing means comprises information storage means connected to said central processor via said bus means.

20. A combination as in claim 6, wherein each of said consoles further comprises a plurality of row selector switches, wherein said memory includes an information field for each row for identifying a keyboard unit selecting that row, and means responsive to an activated combination of said zone and row selector switches for writing the identity of the keyboard unit including said switches into said corresponding identification field in said memory.

21. A combination as in claim 20, wherein said central processor includes means responsive to one of said keyboard information fields identifying a keyboard unit and said zone and row switches at the identified keyboard unit no longer selecting said row for clearing said keyboard unit identification field.

* * * * *